United States Patent [19]

Rotstein et al.

[11] Patent Number: 5,113,801
[45] Date of Patent: May 19, 1992

[54] SELF-CLEANING CAT LITTER BOX

[76] Inventors: Rony Rotstein, 99 Hillside Ave., New York, N.Y. 10040; George Spector, 233 Broadway Rm 3815, New York, N.Y. 10007

[21] Appl. No.: 753,343

[22] Filed: Aug. 30, 1991

[51] Int. Cl.$^5$ ............................................. A01K 29/00
[52] U.S. Cl. .......................................... 119/163; 4/661
[58] Field of Search ............... 119/161, 162, 163, 166, 119/168, 164, 158; 4/300, 661

[56] References Cited

U.S. PATENT DOCUMENTS

| | | | |
|---|---|---|---|
| 3,227,138 | 1/1966 | Campbell | 119/163 |
| 3,747,563 | 7/1973 | Brockhouse | 119/163 |
| 4,117,555 | 10/1978 | Dennis | 119/163 |
| 5,027,451 | 7/1991 | Wooten | 119/162 X |

Primary Examiner—Gene Mancene
Assistant Examiner—Thomas Price

[57] ABSTRACT

A self-cleaning cat litter box is provided which consists of a housing having a floor, side walls, and end walls with an open top, so that a cat can enter. A platform is pivotally mounted at one end proximate one of the end walls of the housing, so that the cat can squat thereon and defecate. A mechanism, activated by the weight of the cat on the platform, is for lifting the platform up on an angle, spraying water upon the platform and lowering the platform back to its original position after the cat leaves the platform. A drain is located at the pivoted end of the platform to carry the waste water therefrom. A mechanism is fluidly connected to the drain for liquefying any solid waste within the waste water so that all of the waste water can be flushed out.

2 Claims, 1 Drawing Sheet

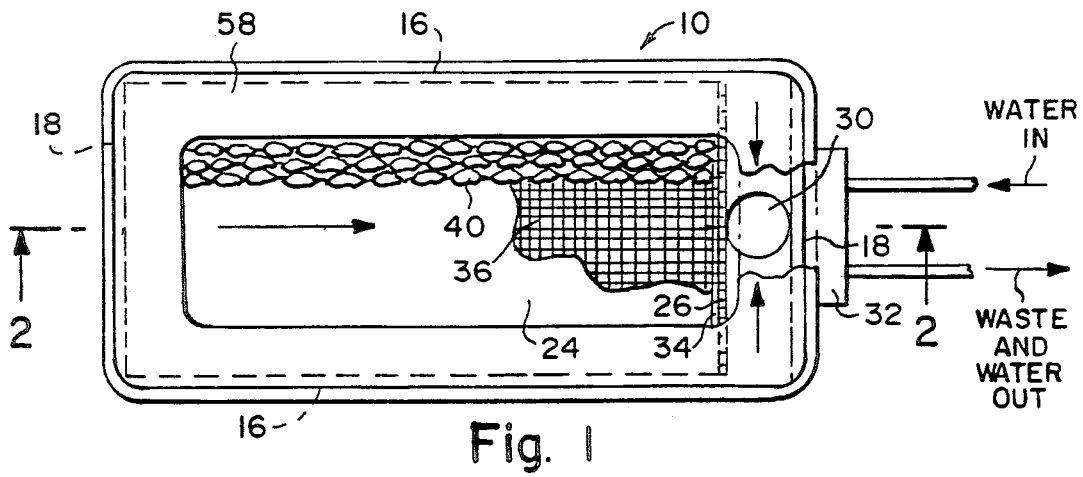
Fig. 1
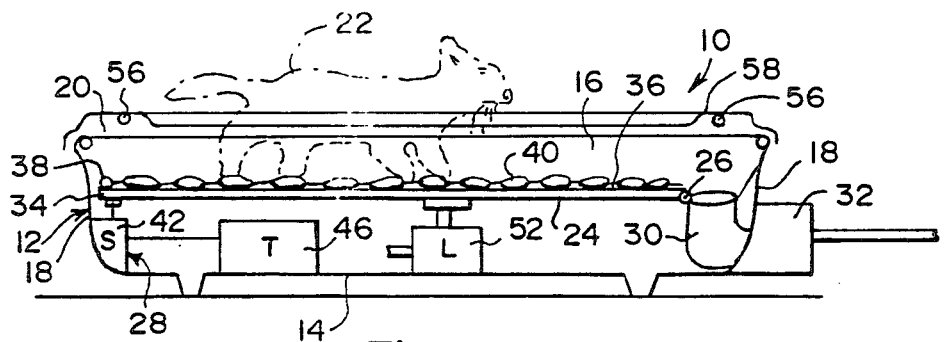
Fig. 2
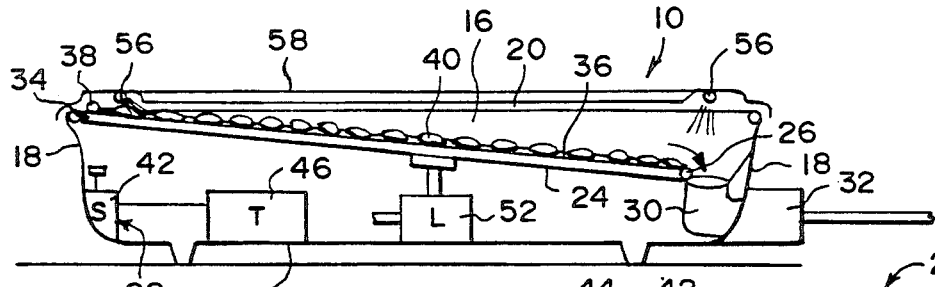
Fig. 3
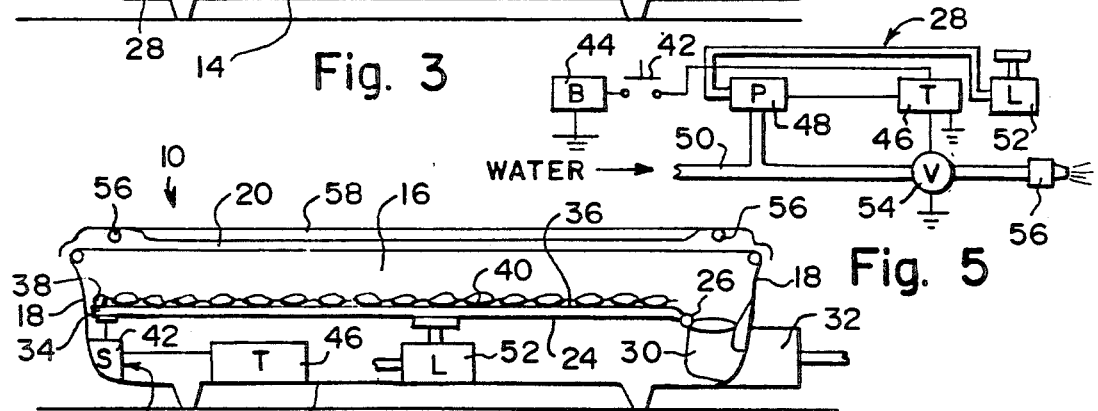
Fig. 4
Fig. 5

SELF-CLEANING CAT LITTER BOX

BACKGROUND OF THE INVENTION

The instant invention relates generally to pet toilets and more specifically it relates to a self-cleaning cat litter box which provides a mechanism which when activated by a cat will flush waste therefrom.

There are available various conventional pet toilets which do not provide the novel improvements of the invention herein disclosed.

SUMMARY OF THE INVENTION

A primary object of the present invention is to provide a self-cleaning cat litter box that will overcome the shortcomings of the prior art devices.

Another object is to provide a self-cleaning cat litter box that will clean waste therefrom in the same basic way that standard toilets evacuate waste, by flushing with water after a cat uses the litter box.

An additional object is to provide a self-cleaning cat litter box that will eliminate the need for messy litter, various odors associated with a cat litter box and the hassle of cleaning the same.

A further object is to provide a self-cleaning cat litter box that is simple and easy to use.

A still further object is to provide a self-cleaning cat litter box that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic top view of the instant invention with parts broken away.

FIG. 2 is a diagrammatic cross sectional view taken along line 2—2 in FIG. 1 with a cat on a level platform.

FIG. 3 is a diagrammatic cross sectional view similar to FIG. 2, with the cat removed from the platform, which is lifted up on an angle and water sprayed thereon, responsive to the cat leaving the platform.

FIG. 4 is a diagrammatic cross sectional view similar to FIG. 2, with the platform moved back to its level position after an appropriate time has passed to permit proper cleaning of the platform.

FIG. 5 is a schematic diagram of the components utilized for cleaning the platform.

DETAILED DESCRIPTION OF THE PREFERRED EMBODIMENTS

Turning now descriptively to the drawings, in which similar reference characters denote similar elements throughout the several views, the Figures illustrate a self-cleaning cat litter box 10 which consists of a housing 12 having a floor 14, side walls 16 and end walls 18 with an open top 20, so that a cat 22 can enter. A platform 24 is pivotally mounted at one end 26 proximate one of the end walls 18 of the housing 12, so that the cat 22 can squat thereon and defecate. A mechanism 28, activated by the weight of the cat 22 on the platform 24, is for lifting the platform 24 up on an angle, spraying water upon the platform 24 and lowering the platform 24 back to its original position after the cat 22 leaves the platform 24. A drain 30 is located at the pivoted end 26 of the platform 24 to carry the waste water therefrom. A mechanism 32 is fluidly connected to the drain 30 for liquefying any solid waste within the waste water, so that all of the water can be flushed out.

The platform 24 has four raised sides 34 thereabout, with the raised side proximate the drain 30 being perforated for drainage. A screen 36 extends across the platform and is supported on the four raised sides 34. When the cat 22 urinates the urine will pass directly through the screen 36 and collect in the platform 24 until the platform 24 is lifted up on an angle. A rod 38 is mounted to the top edge of the platform 24 oppositely from the perforated raised side 34.

A plurality of rock shaped stringed beads 40, are provided with each connected at one end to the rod 38. The free ends are proximate the drain 30 to remain loose to cover the screen 36 as simulated cat litter. This allows the cat 22 to shuffle the stringed beads 40 on the screen 36 to bury the waste. When the platform 24 is lifted and sprayed with water, the stringed beads 40 will be cleaned and returned to their original positions on the screen 36.

The lifting, spraying and lowering mechanism 28 includes a micro switch 42 mounted to the floor 14 of the housing 12 below the free edge of the platform 24 which will close when the cat 22 is upon the platform 24. A power source, such as a battery 44, is electrically connected to one side of the micro switch 42. A timer 46 is electrically connected to other side of the micro switch 42. A water pump 48 is electrically connected to the timer 46 and fluidly connected to a water supply pipe 50. A hydraulic lift mechanism 52 is fluidly connected to the water pump 48 to lift and lower the platform 24. A valve 54 is fluidly connected to the water supply pipe 50 and is electrically connected to the timer 46. A plurality of water jets 56 are fluidly connected to the valve 54 and extends above and about the platform 24 to flush the waste into the drain 30.

A cowl 58 is mounted to the top of the housing 12 to support the water jets 56 above and about the platform 24 and prevents some of the water from splashing outside the litter box 10.

While certain novel features of this invention have been shown and described and are pointed out in the annexed claims, it will be understood that various omissions, substitutions and changes in the forms and details of the device illustrated and in its operation ca be made by those skilled in the art without departing from the spirit of the invention.

What is claimed is:

1. A self-cleaning cat liter box which comprises:
   a) a housing having a floor, side walls and end walls with an open top, so that a cat can enter;
   b) a platform pivotally mounted at one end proximate one of the end walls of said housing, so that the cat can squat thereof and defecate;
   c) means located at an opposite end of said platform activated by the weight of said cat one said platform, for activating a lifting mechanism for lifting said platform up on an angle, spraying water upon said platform and lowering said platform back to its original position after the cat leaves said platform;

d) a drain aligned with and located at said one end of said platform to carry the waste water therefrom; and
e) means fluidly connected to said drain for liquefying any solid waste within the waste water so that all of the waste water can be flushed out; further including:
f) said platform having four raised sides thereabout, with the raised side proximate said drain being perforated for drainage;
g) a screen extending across said platform and supported on the four raised sides, so that when the cat urinates the urine will pass directly through said screen and collect in said platform until said platform is lifted up on an angle;
h) a rod mounted to the top edge of said platform oppositely from the perforated raised side; and
i) a plurality of rock shaped stringed beads, each connected at one end to said rod with its free end proximate said drain to remain loose to cover said screen as simulated cat litter, allowing the cat to shuffle said stringed beads on said screen to bury the waste, so that when said platform is lifted and sprayed with water, said stringed beads will be cleaned and returned to their original positions on said screen; wherein said lifting, spraying and lowering means includes:
j) a micro switch mounted to the floor of said housing below a free edge of said platform which will close when the cat is upon said platform;
k) a power source electrically connected to one side of said micro switch;
l) a timer electrically connected to other side of said micro switch;
m) a water pump electrically connected to said timer and fluidly connected to a water supply pipe;
n) said lifting mechanism comprising a hydraulic lift fluidly connected to said water pump and engaging said platform at a point spaced from said one end to lift and lower said platform;
o) a valve fluidly connected to the water supply pipe and electrically connected to said timer; and
p) a plurality of water jets fluidly connected to said valve and extending above and about said platform to flush the waste into said drain.

2. A self-cleaning cat litter box as recited in claim 1, further including a cowl mounted to the top of said housing to support said water jets above and about said platform and prevent some of the water from splashing outside said litter box.

* * * * *